United States Patent [19]
Takano et al.

[11] Patent Number: 5,973,480
[45] Date of Patent: Oct. 26, 1999

[54] BATTERY CHARGER CAPABLE OF CHARGING A VARIETY OF BATTERIES WITH VARYING CELL NUMBERS

[75] Inventors: Nobuhiro Takano; Kenrou Ishimaru; Toshio Mizoguchi, all of Hitachinaka, Japan

[73] Assignee: Hitachi Koki Co., Ltd., Tokyo, Japan

[21] Appl. No.: 08/929,770

[22] Filed: Sep. 15, 1997

[30] Foreign Application Priority Data

Sep. 13, 1996  [JP]  Japan ................... 8-243200

[51] Int. Cl.$^6$ .................................... H01M 10/46
[52] U.S. Cl. ................................ 320/152; 320/164
[58] Field of Search .................... 320/116, 132, 320/149, 152, 156, 157, 160, 161, 162, 164, DIG. 21, FOR 105, FOR 138, FOR 142

[56] References Cited

U.S. PATENT DOCUMENTS

| | | | |
|---|---|---|---|
| 4,746,852 | 5/1988 | Martin | 320/156 X |
| 4,998,057 | 3/1991 | Shinohara et al. | 320/40 |
| 5,365,160 | 11/1994 | Leppo et al. | 320/160 |

*Primary Examiner*—Edward H. Tso
*Attorney, Agent, or Firm*—Sughrue, Mion, Zinn, Macpeak & Seas, PLLC

[57] ABSTRACT

A battery charger having a battery charger converter, which converter consists of a battery voltage detector for detecting the voltage of a secondary battery and a differential amplifier disposed between the battery voltage detector and an A/D converter. This battery charger is capable of reliably detecting when any battery has become fully charged, including inactive batteries such as batteries that are still warm from recently being discharged and batteries that have been inactive for a long period of time.

7 Claims, 4 Drawing Sheets

BATTERY CHARGER CAPABLE OF CHARGING A VARIETY OF BATTERIES WITH VARYING CELL NUMBERS

BACKGROUND OF THE INVENTION

1. Field of the Invention

The present invention relates to a battery charger for charging a secondary battery, such as a nickel cadmium battery, which battery charger is capable of rapidly and reliably charging a variety of batteries with varying cell numbers.

2. Description of the Prior Art

U.S. Pat. No. 4,998,057 describes a technology for rapidly and reliably charging a variety of secondary batteries with varying cell numbers. This technology includes a plurality of voltage division resistors having different resistances. The voltage division resistors are used to divide the voltage across the battery. A relevant voltage division resistor is selected by a microcomputer depending on the battery voltage so that an input voltage applied to an A/D converter may fall within a predetermined range regardless of the number of cells, that is, regardless of the battery voltage.

With this technology, the fully charged condition of the battery can be accurately detected by a so-called $-\Delta V$ detection method in which charging of the battery is stopped when a predetermined voltage drop ($-\Delta V$) is detected after the voltage of the battery in the charging process reaches the peak. This technology can also be used in conjunction with other methods for detecting the fully charged condition of the battery, such as a method for stopping charging before the battery voltage reaches the peak or a second order differential detection method. The former method is advantageous in preventing the battery from being overcharged and improving the recharging cycle life of the battery, that is, the number of times the battery can be charged. The latter method uses a second order differential of the battery voltage during charging process differentiated by time. When the second order differential of the battery voltage becomes negative, it is determined that the battery voltage has reached the peak.

Among others, the second order differential detection method, which allows fewer overcharges than the $-\Delta V$ detection method, is gradually becoming the main detection method in use. The second order differential detection method increases the cycle life of batteries by allowing fewer overcharges than the $-\Delta V$ detection method, decreasing the number of times pressure increases occur in the battery as a result of oxygen gas being generated in the final stages of charging. Further, leakage of electrolytic solution in the battery is decreased through the operation of a safety valve included in the battery. The second order differential detection method is particularly widely used for charging batteries in which charging and discharging is performed with a large current, as is with the batteries in electric tools.

However, when charging inactive batteries, such as batteries that are new or have been left unused for a long period of time, the amount of voltage change is small, and such batteries are, therefore, very difficult to determine the fully charged condition using the second order differential detection method.

FIG. 3 is a graphical representation showing a battery voltage during the charging process and also a digital value corresponding to the voltage increase. The battery voltage is sampled at a predetermined time interval, and the voltage sampled is converted by an 8-bit A/D converter to a digital value ranging from 0 to 255 in decimal notation. The new digital value of the battery voltage is compared with a previous digital value and the increase in the digital value corresponding to the voltage increase is shown in the graph of FIG. 3.

As seen in this graph, the rise in voltage over time when charging an inactive battery is gentle in comparison to that of an active battery, shown in FIG. 5. The voltage in the final stage of charging the inactive battery peaks slowly, and since the amount of voltage change is small, it is not possible to reliably detect that the battery has reached the fully charged condition using the second order differential detection method to determine when the second order differential of the battery voltage becomes negative. As shown in FIG. 3, the digital value representing the voltage increase of the inactive battery is only 1. This example uses a 10-cell battery. The voltage developed across the battery is subjected to a voltage division with a ratio of 0.203. Therefore, the voltage increase corresponding to one digital value would be $5/0.203 \times 1/255 = 96.6$ mV, or 9.66 mV/cell where the reference voltage of the 8-bit A/D converter is 5 volts. In this example, the second order differential value for the battery voltage is determined negative when the voltage drops from 1 to 0 in digital value. Since such change in the digital values occurs frequently from the beginning of the charging process, a fully charged condition of the battery cannot be reliably detected. Hence, in order to reliably detect a full charge by determining when the second order differential value of the battery voltage becomes negative, the converted voltage increase must be at least 2 in digital value. The charging process would then be stopped when the converted voltage drops at least 2 in digital values. In this case, a full charge cannot be reliably determined when charging an inactive battery.

FIG. 4 shows the charging of a battery that is warm because it is just after discharge. The voltage of this battery in the final stage also peaks slowly. For the same reasons as described above, a charging control method that detects a negative change in voltage cannot reliably detect the amount of voltage change with the limited resolution of an A/D converter.

In recent years, the demand to replace nickel cadmium batteries with nickel hydrogen batteries has grown in response to a need for higher capacity. Still, nickel hydrogen batteries have the same problems as described above, because the peak at full charge is not as sharp as nickel cadmium batteries.

Further, for a universal battery charger designed to charge batteries with varying cell numbers, for example all batteries with an even number of cells from a 4-cell battery to a 20-cell battery, a total of nine voltage division ratio settings are required. Naturally, in order to select one of the voltage division resistors to suit a battery voltage using a microcomputer, the microcomputer must be equipped with nine output ports, increasing the number of pins in the microcomputer and, as a result, increasing the size of the microcomputer.

SUMMARY OF THE INVENTION

In view of the foregoing, it is an object of the present invention to provide a battery charger capable of reliably detecting when any secondary battery has become fully charged, without the deficiencies of the prior art described above.

Another object of the present invention is to provide a universal battery charger capable of setting prescribed voltage division ratios without increasing the size of the microcomputer.

To achieve the above and other objects, the battery charger is provided with a battery voltage detection means that ensures that the battery voltage always fluctuates within a specific range during charging, provided the charging current is at a uniform value, and that contains a plurality of voltage division ratios for a plurality of voltage division resistors; and a battery voltage conversion means including a differential amplifier between the microcomputer and the A/D converter.

The microcomputer is used to set a desired voltage division ratio to correspond to the battery voltage, by selecting a combination of from one to a plurality of voltage division resistors from the plurality of voltage division resistors in the battery voltage detection means.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

A battery charger according to a preferred embodiment of the present invention will be described while referring to the accompanying drawings.

Figure 1:
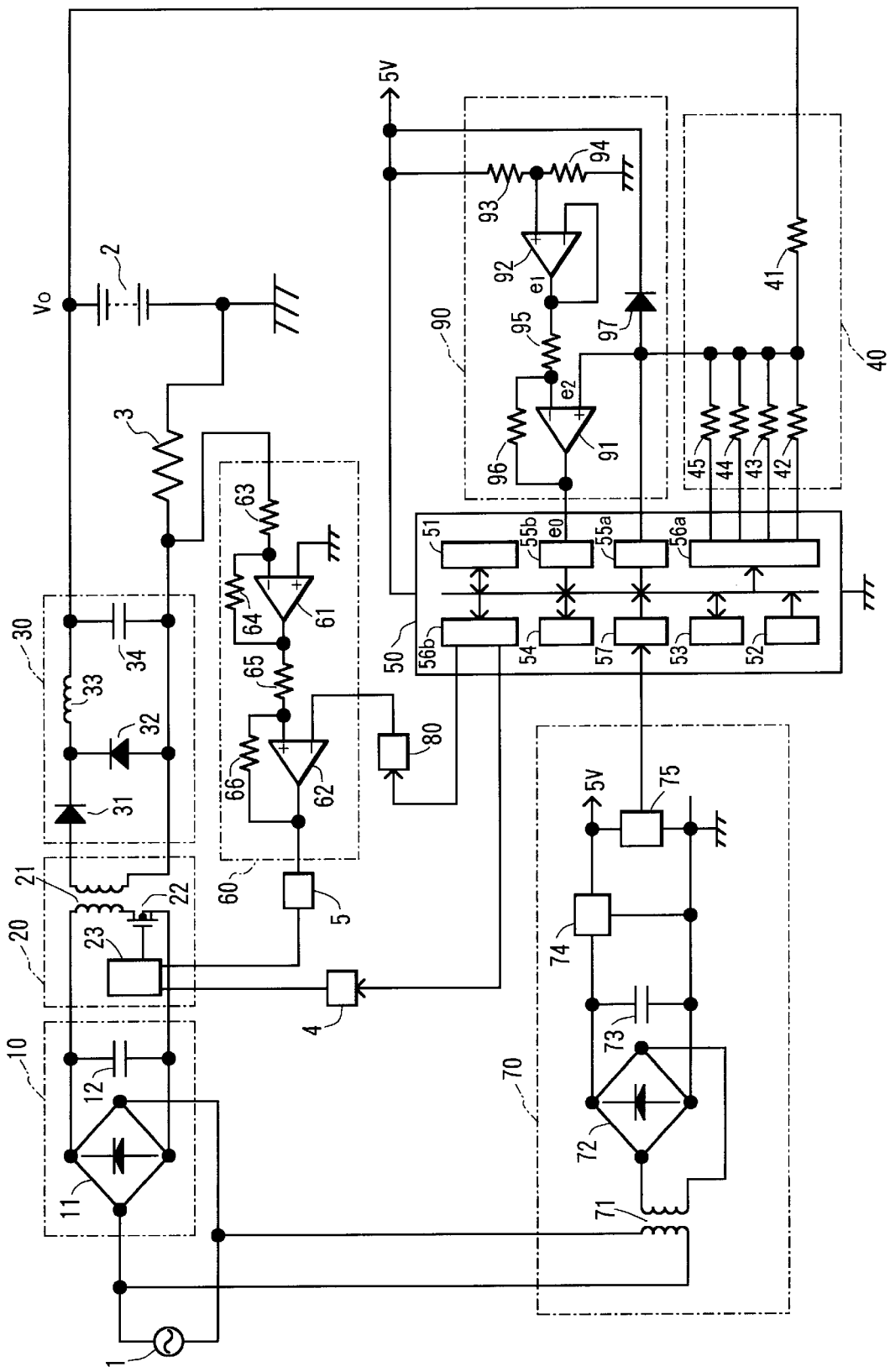
FIG. 1 is a circuit diagram, partially in block form, showing a battery charger according to the embodiment of the present invention.

FIG. 1 shows a circuit configuration of the battery charger according to the preferred embodiment. The circuit includes an AC power supply 1, a secondary battery 2 containing a plurality of rechargeable battery cells connected in series, a current detecting device 3 for detecting charging current flowing to the secondary battery 2, a charge control signal transmitter 4 for transmitting control signals to start or stop the charging process, and a charging current signal transmitter 5 for feeding back a charging current signal to a PWM (pulse width modulation) control IC 23 described below. The charge control signal transmitter 4 and charging current signal transmitter 5 are configured by a photocoupler, or the like.

The circuit also includes a first rectifying/smoothing circuit 10 connected to the AC power supply 1, a switching circuit 20 connected to the output of the first rectifying/smoothing circuit 10, a second rectifying/smoothing circuit 30 connected to the output of the switching circuit 20, a microcomputer 50, a battery voltage detector 40 connected between the battery 2 and the microcomputer 50, a charging current controller 60, a constant voltage power supply 70, a charging current setting device 80, and a battery voltage converter 90.

The first rectifying/smoothing circuit 10 includes a full-wave rectifier circuit 11 and a smoothing capacitor 12. The switching circuit 20 includes a high-frequency transformer 21, a MOSFET 22, and the PWM control IC 23 mentioned above. The PWM control IC 23 is a switching power supply IC for changing the driving pulse width of the MOSFET 22 to adjust the output voltage of the first rectifying/smoothing circuit 10.

The second rectifying/smoothing circuit 30 includes diodes 31 and 32, a choke coil 33, and a smoothing capacitor 34. The battery voltage detector 40 includes resistors 41 through 45. One or a plurality of the resistors 42 through 45 are selected using the output ports 56a in the microcomputer 50 by grounding the corresponding resistors. The voltage across the battery 2 is subjected to a voltage division with a voltage division ratio determined by the resistor 41 and one or more resistors selected from the resistors 42 through 45. The resultant divided voltage is applied to the non-inverting input terminal of the operational amplifier 91 in the battery voltage converter 90 and the A/D converter 55a of the microcomputer 50, all described later.

The microcomputer 50 includes a CPU 51, a ROM 52, a RAM 53, a timer 54, A/D (analog-to-digital) converters 55a and 55b, output ports 56a and 56b, and a reset input port 57. The charging current controller 60 includes operational amplifiers 61 and 62 and resistors 63 through 66. The constant voltage power supply 70 includes a power supply transformer 71, a full-wave rectifier circuit 72, a smoothing capacitor 73, a 3-terminal regulator 74, and a reset IC 75. The constant voltage power supply 70 provides power to the microcomputer 50, charging current controller 60, and the like. The reset IC 75 outputs a reset signal to the reset input port 57 to initialize the microcomputer 50.

The charging current setting device 80 is provided for changing a reference voltage applied to the inverting input terminal of the operational amplifier 62 based on the signal from the output port 56b, that is, the charging current to be flowed in the battery. The charging current is determined depending on the level of the reference voltage set to the inverting input terminal of the operational amplifier 62. The battery voltage converter 90 is configured by operational amplifiers 91 and 92, resistors 93 through 96, and an input protection diode 97a, thereby forming a differential amplifier.

Next, the operations of the battery voltage detector 40 and the battery voltage converter 90 will be described, including the corresponding operations of the microcomputer 50. For the sake of explanation, it is assumed that the battery charger is designed to be suitable for a secondary battery 2 having from 4 to 20 battery cells, including only even-numbered cell batteries. Resistances of the resistors 41 through 45 and 93 through 96 are as follows:

resistor 41=20kΩ;
resistor 42=5.1kΩ;
resistor 43=10kΩ;
resistor 44=10kΩ;
resistor 45=20kΩ;
resistor 93=20kΩ;
resistor 94=56kΩ;
resistor 95=10kΩ; and
resistor 96=20kΩ.

Further, the output voltage range of the operational amplifier 91 will be assumed to be between 0.2 and 4.2 V, although the actual output voltage range depends on the offset voltage and maximum amplitude voltage properties of the operational amplifier.

Battery voltage range I of Table 1 below shows the battery voltage corresponding to batteries having varying numbers of cells, and ranges from about 0 to 2.5 V per cell. The voltage of a battery during the charging process differs according to the charging current, battery temperature, and the like but ordinarily fluctuates within a range of from 1.25 V/cell to 1.90 V/cell. Therefore, a sufficiently large range of from 0 to 2.5 V is input into the A/D converter 55*a*.

The voltage division ratio divides battery voltage range I into a range from 0 to 5 V for applying the divided voltage to the A/D converter 55*a*. The output port 56*a* connects a resistor or a combination of resistors selected from resistors 42 through 45 to ground in order to set the voltage division ratio.

Battery voltage range II indicates a battery voltage range which causes the output of the battery voltage converter 90 (differential amplifier), i.e., the input voltage to the A/D converter 55*b* to fall in a range from 0.2 to 4.2 V.

TABLE

| Cell No. | Battery Voltage Range I (V) | Voltage Division Ratio | Selected Resistors | Battery Voltage Range II (V) |
|---|---|---|---|---|
| 4  | 0–10.0 | 0.500 | 45         | 5.05–7.71   |
| 6  | 0–15.0 | 0.333 | 43         | 7.57–11.57  |
| 8  | 0–20.0 | 0.250 | 43, 45     | 10.09–15.42 |
| 10 | 0–24.6 | 0.203 | 42         | 12.59–19.25 |
| 12 | 0–29.6 | 0.168 | 42, 45     | 14.95–22.85 |
| 14 | 0–34.6 | 0.142 | 42, 43     | 17.46–26.69 |
| 16 | 0–39.6 | 0.126 | 42, 44, 45 | 19.99–30.55 |
| 18 | 0–44.6 | 0.112 | 42, 43, 44 | 22.51–34.42 |
| 20 | 0–49.6 | 0.101 | 42–45      | 25.03–38.25 |

As described above, in order to set the specified voltage division ratio appropriate for the number of cells in the secondary battery 2, the microcomputer 50 selects and grounds via the output port 56*a* one or a plurality of the resistors 42 through 45 according to the combinations listed in the Table. Then, the battery voltage input into the A/D converter 55*a* stays within a fixed voltage range of about 0 to 2.50 V/cell. Any of these voltage division ratios can be set by a combinations of the four resistors 42 through 45.

Battery voltage range II of the Table sets the above resistance for the range 1.25 to 1.90 V/cell, in which range battery voltages ordinarily fluctuate. As shown in FIG. 1, e1 is the output voltage of the operational amplifier 92, and is calculated at the above resistor using the following equation.

$$e1 = 5(V) \times (R94/(R93+R94)) = 3.68V \quad (1)$$

Further, e2 is the voltage applied to the non-inverting input terminal of the operational amplifier 91, and equals the battery voltage multiplied by the voltage division ratio of the battery voltage detector 40. Also, e0 is the voltage applied to the A/D converter 55*b*, and is calculated with the following equation:

$$e0 = e2 \times \{(R95+R96)/R95\} - e1 \times (R96/R95) \quad (2)$$

or $$e0 = 3e2 - 2e1 \quad (3)$$

In other words, the battery voltage converter 90 is a circuit that applies the output voltage of the battery voltage detector 40 to the non-inverting input terminal of the operational amplifier 91, and outputs a voltage equal to a non-inverted voltage which is three times as large as the voltage e2 minus two times amplified reference voltage e1.

If e0=0.2 V and e1=3.68 V, then from equation (3) e2=2.52 V. If the latter voltage is made to correspond to the battery voltage using the voltage division ratios of the Table, e2 is about 1.25 V/cell. If a battery voltage of no more than about 1.25 V/cell is applied to the non-inverting input terminal of the operational amplifier 91, an offset voltage is output from the operational amplifier 91 and is applied to the A/D converter 55*b*.

On the other hand, if e0=4.2 V and e1=3.68 V, then from equation (3) e2=3.85 V. If the latter voltage is made to correspond to the battery voltage using the voltage division ratios of Table 1, e2 is about 1.90 V/cell. If a battery voltage of at least about 1.90 V/cell is applied to the non-inverting input terminal of the operational amplifier 91, the output of the operational amplifier 91 is the maximum amplitude voltage and is applied to the A/D converter 55*b*.

Hence, the voltage in the range from 0.2 to 4.2 V applied to the A/D converter 55*b* corresponds to the battery voltage in the range from 1.25 to 1.90 V/cell. In other words, the battery voltage converter 90 and the various resistors are designed so that the voltage range in which battery voltages fluctuate is applied to the A/D converter 55*b*. Obviously, the resistances for the various resistors are not limited to those mentioned above.

Here, comparison will be made with respect to the voltage change detections according to the conventional method and the present embodiment.

With the conventional method, the resolution of an 8-bit converter is:

$$2.50V \times 1/255 = 9.80 \text{ mV/cell.}$$

This means that the voltage per cell for one digital value represented by decimal notation equals 9.80 mV.

On the other hand, with the present embodiment, the resolution of the 8-bit A/D converter 55*b* is:

$$(1.90V - 1.25V) \times 5V/(4.2V - 0.2V) \times 1/255 = 3.19 \text{ mV/cell.}$$

This means that the voltage per cell for one digital value represented by decimal notation equals 3.19 mV. This result compared to the result above for the conventional method shows an improvement in precision of about 3 times (9.80 mV/3.19 mV). Therefore, it is possible to reliably detect when a battery reaches a full-charge, even when the voltage change of the secondary battery 2 is slight.

Figure 2:
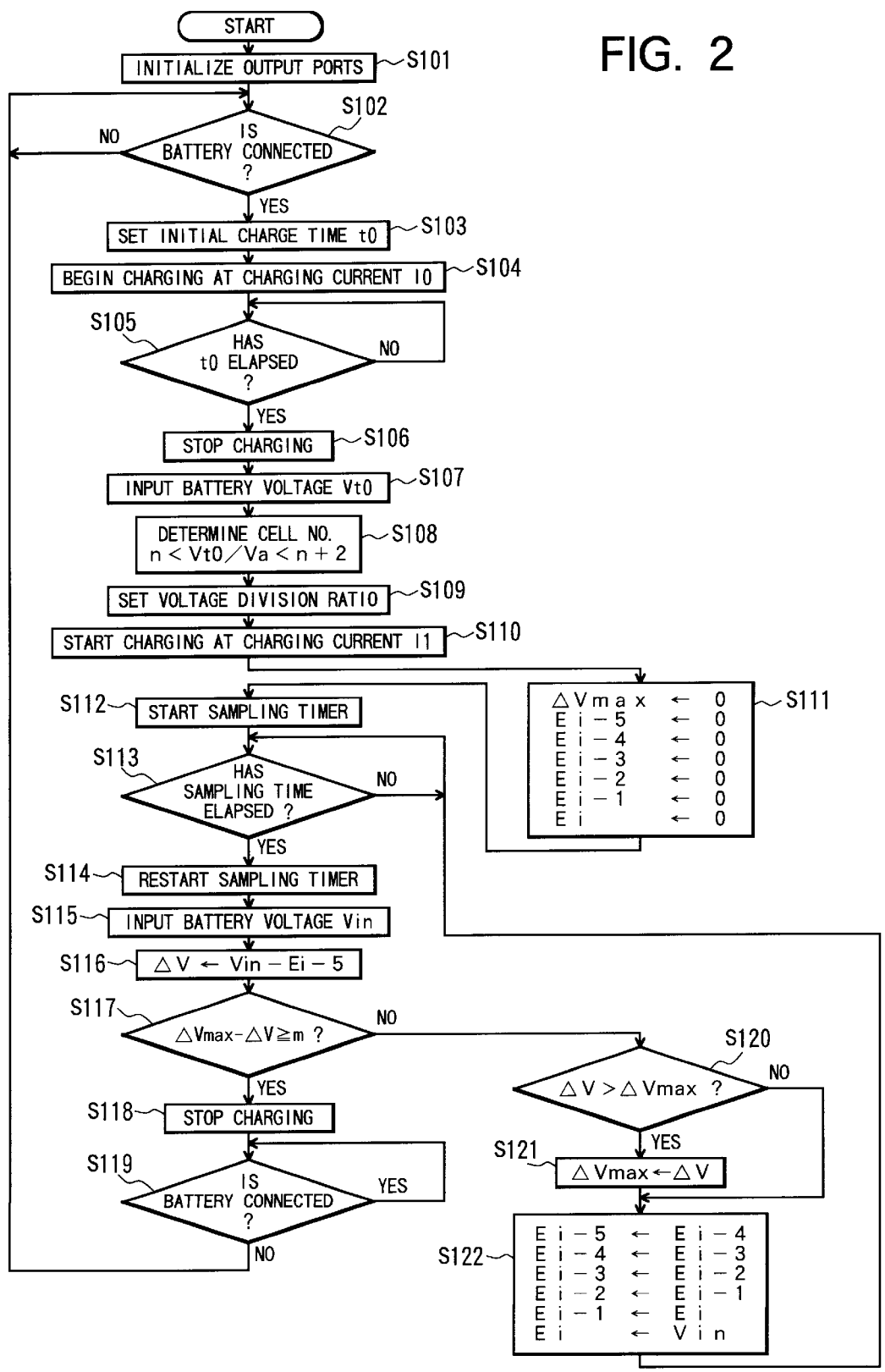
FIG. 2 is a flowchart explaining the operations of the present invention.
Figure 3:
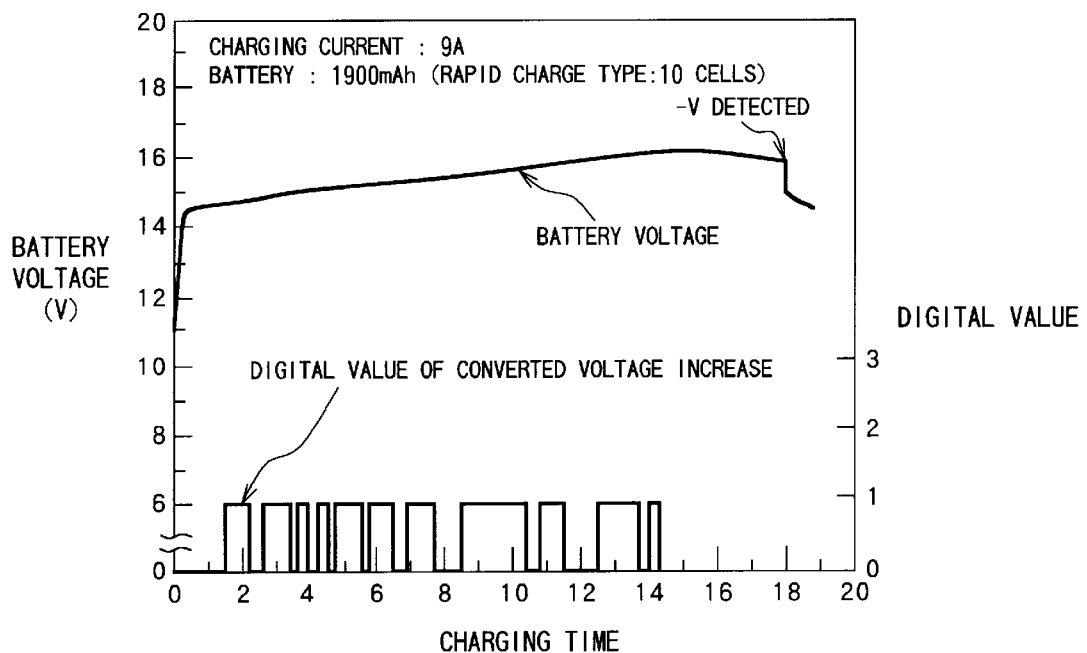
FIG. 3 is a graphical representation showing the charging characteristics of an inactive battery.
Figure 4:
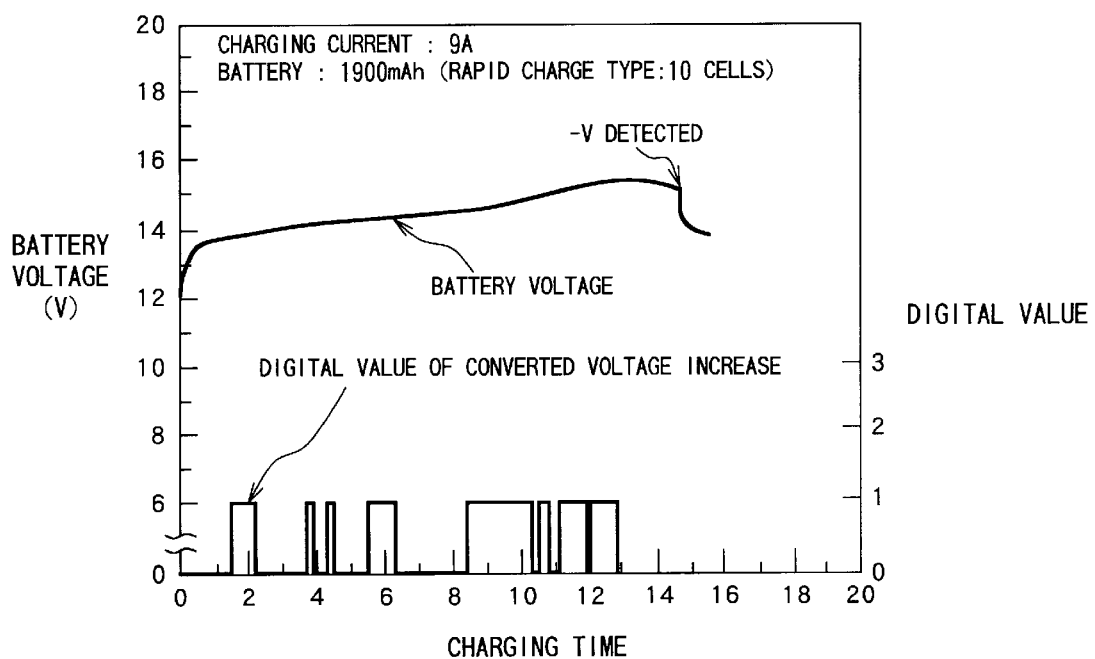
FIG. 4 is a graphical representation showing the charging characteristics of a battery that is warm from recently being discharged.
Figure 5:
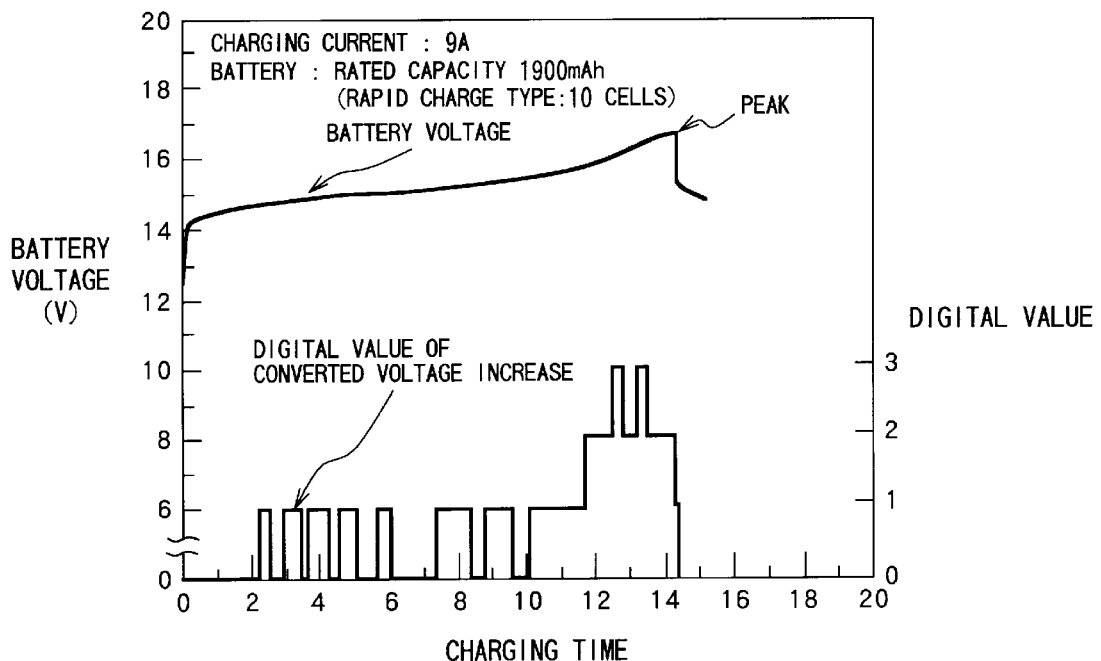
FIG. 5 is a graphical representation showing the charging characteristics of an active battery.

Next, the operations for the battery charger of the present embodiment will be described with reference to FIG. 1 and the flowchart in FIG. 2. When the power supply is turned on, the microcomputer 50 initializes all of its output ports 56*a* and 56*b* (S101) and waits for a secondary battery 2 to be connected (S102). When a secondary battery 2 is connected ("yes" in S102), the number of cells in the battery is initially investigated. This is done by comparing the battery voltage with a reference voltage upon preliminary charging the battery. Specifically, the microcomputer 50 sets the initial charging time t0 according to signals received from the battery voltage detector 40 (S103). Next, the charge control signal transmitter 4 transmits charge start signals to the PWM control IC 23 via the output port 56*b*; the charging current setting device 80 applies the charging current reference voltage $V_{I0}$ to the operational amplifier 62 via the output port 56*b*; and the battery charger begins charging at the charging current I0 (S104). At the same time charging is started, the charging current flowing through the secondary battery 2 is detected by the current detecting device 3. The charging current controller 60 feeds back the difference between the voltage corresponding to this charging current and the charging current reference voltage $V_{I0}$ to the PWM control IC 23 via the charging current signal transmitter 5. Specifically, when the charging current is small, a widened pulse is applied to the high-frequency transformer 21 and smoothed to direct current by the second rectifying/smoothing circuit 30, and the charging current is maintained uniformly at I0. Hence, the charging current is maintained at a desired current value I0 by the current detecting device 3, charging current controller 60, charging current signal transmitter 5, switching circuit 20, and the second rectifying/smoothing circuit 30.

Charging is continued until the time t0 has elapsed after beginning charging (S105). After the time t0 has elapsed ("yes" in S105), the microcomputer 50 transfers a charge stop signal to the PWM control IC 23, and the charging is stopped (S106). Because the type of the battery connected to the charger, i.e., the number of cells of the battery, is unknown, the resistors 42 through 45 of the battery voltage detector 40 are connected to ground to set the smallest voltage division ratio set for a 20-cell battery as indicated in the Table. Thereafter, the resistor or resistors selected for various cell number batteries are sequentially connected to ground in the order from the larger cell number battery to the least cell number battery, i.e., to the 4-cell number battery. As a result, the voltage division ratios set in the battery voltage detector 40 are sequentially switched. The battery voltage detected by the battery voltage detector 40 at the time charging is stopped is applied to the A/D converter 55a to find the battery voltage $V_{r0}$ (S107). The battery voltage $V_{r0}$ can be calculated by dividing the voltage applied to the A/D converter 55a with the corresponding voltage division ratio. The voltage $V_{r0}$ is compared with the reference voltage nVa, which is preset for each battery, and the number of cells in the secondary battery 2 is determined (S108). Here, n is the number of cells and Va is the reference voltage per each cell. The minimum voltage for a nickel cadmium battery is about 1.2 V, but the voltage may be higher than 1.2 V depending on remaining capacity of the battery and battery temperature.

Next, the voltage division ratio corresponding to the number of cells is set by connecting corresponding resistor or resistors to ground (S109). The charge control signal transmitter 4 transmits a charge start signal to the PWM control IC 23 via the output port 56b; the charging current setting device 80 applies a charging current reference voltage $V_{f1}$ to the operational amplifier 62; and the charging of the secondary battery 2 is restarted at the charging current I1 (S110).

Next, storage data in the RAM 53 is initialized, as well as comparison values between the newest battery voltage and several previously sampled voltages (S111), and the battery voltage sampling timer is started (S112). When the sampling time has elapsed ("yes" in S113), the battery voltage sampling timer is started again (S114). The battery voltage divided by the battery voltage detector 40 is input by the battery voltage converter 90 into the A/D converter 55b and converted to a digital value. This voltage is stored as the battery voltage $V_{in}$ (S115). The ΔV is obtained by subtracting the input battery voltage Ei-5 of six samples earlier from this battery voltage $V_{in}$ using the CPU 51 (S116).

Next, the ΔV obtained in S116 is compared with a $\Delta V_{max}$ (S117). If the value remaining after subtracting the ΔV from the $A\Delta_{max}$ is greater than or equal to m in digital value ("yes" in S117), the microcomputer 50 transfers via the charge control signal transmitter 4 a charge stop signal to the PWM control IC 23 to stop the charging (S118). Here, m is an integer that changes according to the resolution of the A/D converter, the sampling time, and the charging current. For example, when using a battery voltage converter 90 of the present embodiment, an 8-bit A/D converter 55b, a charging current of 9 A, and a sampling time of 5 seconds, m is set to between 4 and 6. Usually, digital values ranging from 1 to 3 are necessary because the voltage fluctuates within this range just before the voltage increase peaks and the battery becomes fully charged. The microcomputer 50 waits until the secondary battery 2 is disconnected (S119), and the process returns to S102 when it is determined that the secondary battery 2 has been disconnected ("no" in S119), and waits for another battery to be connected.

When the value remaining after subtracting the ΔV from the $\Delta V_{max}$ is less than m, the ΔV is compared to the $\Delta V_{max}$ (S120). If the ΔV is greater than the $\Delta V_{max}$ ("yes" in S120), the data for the $\Delta V_{max}$ in the RAM 53 is replaced with the value of the ΔV (S121). If the ΔV is less than or equal to the $\Delta V_{max}$ ("no" in S120), S121 is skipped. Next, the battery voltage values stored in the RAM 53 are rewritten to include the latest battery voltage $V_{in}$ (S122), and the process returns to S113.

Figure 6:
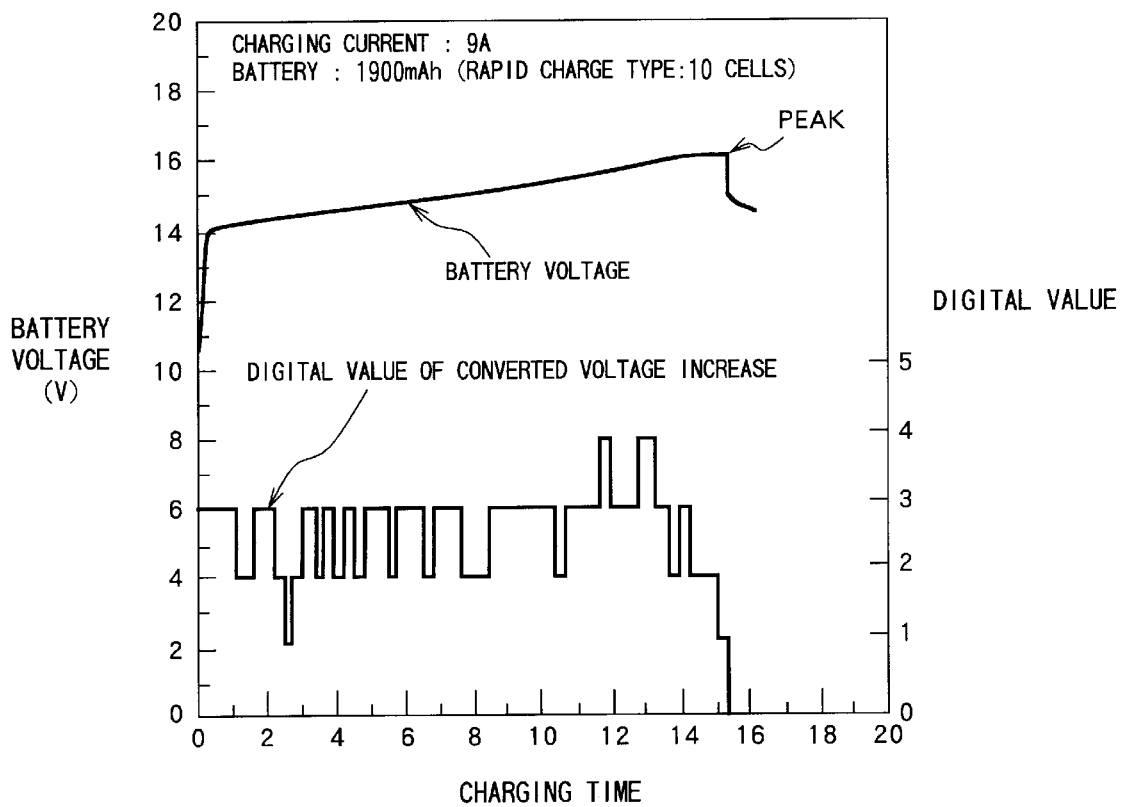
FIG. 6 is a graphical representation showing the charging characteristics of an inactive battery according to the present embodiment.

FIG. 6 shows the charging characteristics for an inactive battery according to the present embodiment. By providing the battery voltage converter 90, the change in battery voltage can be detected with great precision, and it is possible to reliably detect when a battery of any condition is fully charged by using a second order differential method which determines when the battery is charged to full capacity by detecting when the second order differential of the battery voltage becomes negative.

As described in the embodiment above, a battery charger of the present invention is capable of reliably controlling the detection of fully charged battery even when the voltage change of the battery being charged is small.

What is claimed is:

1. A battery charger comprising:
   a battery voltage detector for detecting a voltage of a battery being charged and outputting a first battery voltage signal indicative of the voltage of the battery;
   a battery voltage converter for converting the first battery voltage signal to a second battery voltage that changes within a predetermined range corresponding to a variable range of the voltage of the battery being charged, the second battery voltage being in a form of an analog signal;
   an analog-to-digital converter for converting the second battery voltage to a digital value; and
   a full charge detector for detecting, based on the digital value, that the battery has reached a fully charged condition.

2. A battery charger as claimed in claim 1, wherein said battery voltage converter comprises a differential amplifier having a first input receiving a reference voltage and a second input receiving the first battery voltage and outputting the second battery voltage.

3. A battery charger as claimed in claim 1, wherein the battery voltage detector comprises a plurality of voltage division resistors allowing one of a plurality of voltage division ratios to be selected.

4. A battery charger as claimed in claim 3, wherein at least one of said plurality of voltage division resistors is selected to set one of the plurality of voltage division ratios.

5. A battery charger as claimed in claim 4, wherein the plurality of voltage division ratios are set so that the first battery voltage is substantially constant for batteries with varying cell numbers.

6. A battery charger as claimed in claim 1, wherein said full charge detector comprises calculating means for sequentially calculating an amount of change in voltage in the battery being charged and outputting calculation results, wherein said full charge detector stops charging based on the calculation results.

7. A battery charger as claimed in claim 1, further comprising cell number detector for detecting a number of cells making up the battery being charged.

* * * * *